July 7, 1931.  P. S. MILLAR ET AL  1,813,185

OPTICAL ILLUMINATING SYSTEM

Filed April 14, 1927  2 Sheets-Sheet 1

Inventor
Preston S. Millar 2nd
Harald H. Miller
By their Attorney

Patented July 7, 1931

1,813,185

UNITED STATES PATENT OFFICE

PRESTON S. MILLAR, OF BROOKLYN, AND HAROLD H. MILLAR, OF NEW YORK, N. Y., ASSIGNORS TO ELECTRICAL TESTING LABORATORIES, OF NEW YORK, N. Y., A CORPORATION OF NEW YORK

OPTICAL ILLUMINATING SYSTEM

Application filed April 14, 1927. Serial No. 183,667.

This invention relates to methods of inspecting the interior of bodies having translucent outer walls and to an optical illuminating system for carrying out such a method.

It has for its object to provide a method by which the interior, and more particularly opaque objects carried within the interior, of bodies whose interior medium is transparent or translucent and whose outer wall is relatively translucent, may be inspected, and to an optical illuminating system for use in accomplishing or practicing said method which generally stated consists in producing upon a small portion of the surface of the article to be inspected a concentrated light of comparatively high intensity.

Briefly these objects are accomplished by focusing upon the surface of the article to be inspected, as a frosted or superficially coated incandescent lamp, a pencil of light rays of comparatively high intensity, to thereby cast upon the wall opposite that to which the light is applied, a shadow of the interposed opaque elements, such as the filament of the lamp. When a light of suitable intensity is thus concentrated upon a small portion of the surface of such an object, there is formed an apparent or secondary source of light upon the surface, the penetration of the wall by the light rays causing them to be widely dispersed in all directions. Thus with proper concentration and relative intensity of the light (as compared to that upon the remainder of the surface of the object) the dispersed penetrating rays will cast a sharp shadow of the interposing elements upon the opposite walls, this wall thus serving as a projection screen. This shadow is a somewhat distorted image of the interposing elements. the distortion being due to the curvature of the surface serving as a screen, and may be made readily visible even when the surrounding illumination approximates that present on a bright day.

To these and other ends, the invention consists in further features all of which will be more fully described and thoroughly understood with the aid of the following description in connection with the accompanying drawings, the novel features being particularly set forth in the appended claims.

In the drawings:—

Similar reference characters have been employed throughout to indicate similar parts.

Our invention is particularly adapted for use in the inspection of the interior of bodies having a substantially transparent interior medium with relatively translucent outer walls, as coated or frosted incandescent lamps, and comprises, generally, directing light rays of comparatively high intensity upon a small portion of the area of the surface of the object or in other words, concentrating light rays of high intensity, as compared with the surrounding illumination, upon the surface of the object. This may be accomplished, for example, by directing a pencil of rays from a suitable source through a small orifice and positioning the article to be examined on the other side of the orifice. Under these conditions, the rays produced on the surface of the lamp will, upon penetrating the translucent wall, be widely dispersed or scattered in all directions, thereby apparently creating a secondary source of light upon the lamp surface, and these dispersed penetrating rays from the secondary source cast a sharp shadow of the interposing elements upon the opposite wall of the lamp. The shadow thus cast on the opposite lamp wall, which serves substantially as a projection screen, will be a somewhat distorted, though sharp, image of the interposing elements the distortion being due to the curvature of the wall; it may however, be made readily visible, even when the surrounding illumination is of comparatively high intensity, by the use of light rays of suitably high intensity and by properly concentrating the same upon the lamp surface. By suitably orienting the object being examined, its entire interior may be readily explored.

The pattern or shadow cast upon the wall serving as the projection screen will vary with the nature and particularly the translucency of the outer wall of the article, and will serve also as a gauge of the diffusing qualities of said wall or surface. When the article or object is a coated incandescent lamp bulb, for example, the pattern will vary with, and may be employed as a gauge of, the density and nature of the frosting or coating of the surface.

Figure 1:
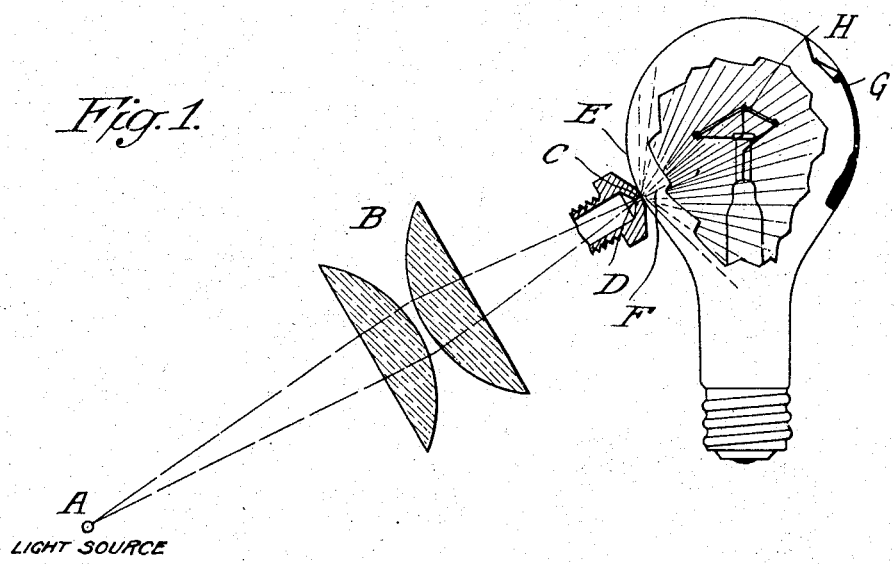
Fig. 1 is a diagrammatic view showing the path of the rays of light when the invention is applied to the inspection of a coated incandescent lamp.

In the preferred method of the invention, we have concentrated the applied light rays by interposing between the light source and the object being examined an optical condensing system whereby the light rays passing therethrough are focused at a distant point and the surface of the object to be examined is positioned at said point. Referring to Fig. 1, which shows the path of the light rays and illustrates the principle of the invention as applied to the inspection of the filament and filament mounting of a frosted incandescent lamp bulb, light rays from a source A are directed through a suitable optical condensing system B by which they are focused at a distant point C where there is positioned a suitable opaque member having a small aperture D to further insure the concentration of the light rays and the lamp E is positioned with a portion of its surface in the path of the focused rays adjacent the outgoing side of the orifice D. Thus there is produced on the surface of the lamp a highly concentrated pencil of light rays which, upon penetrating the wall of the lamp, will be widely dispersed as shown at F, thereby casting a sharp shadow G of the lamp filament H upon the wall of the lamp directly opposite the point of application.

Figure 2:
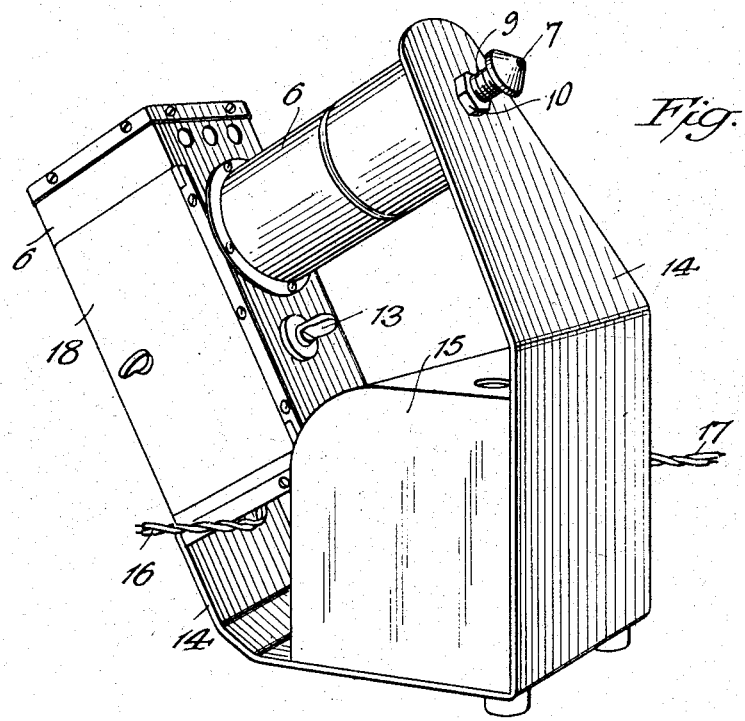
Fig. 2 is a perspective view of one form of a device constructed in accordance with the invention.
Figure 3:
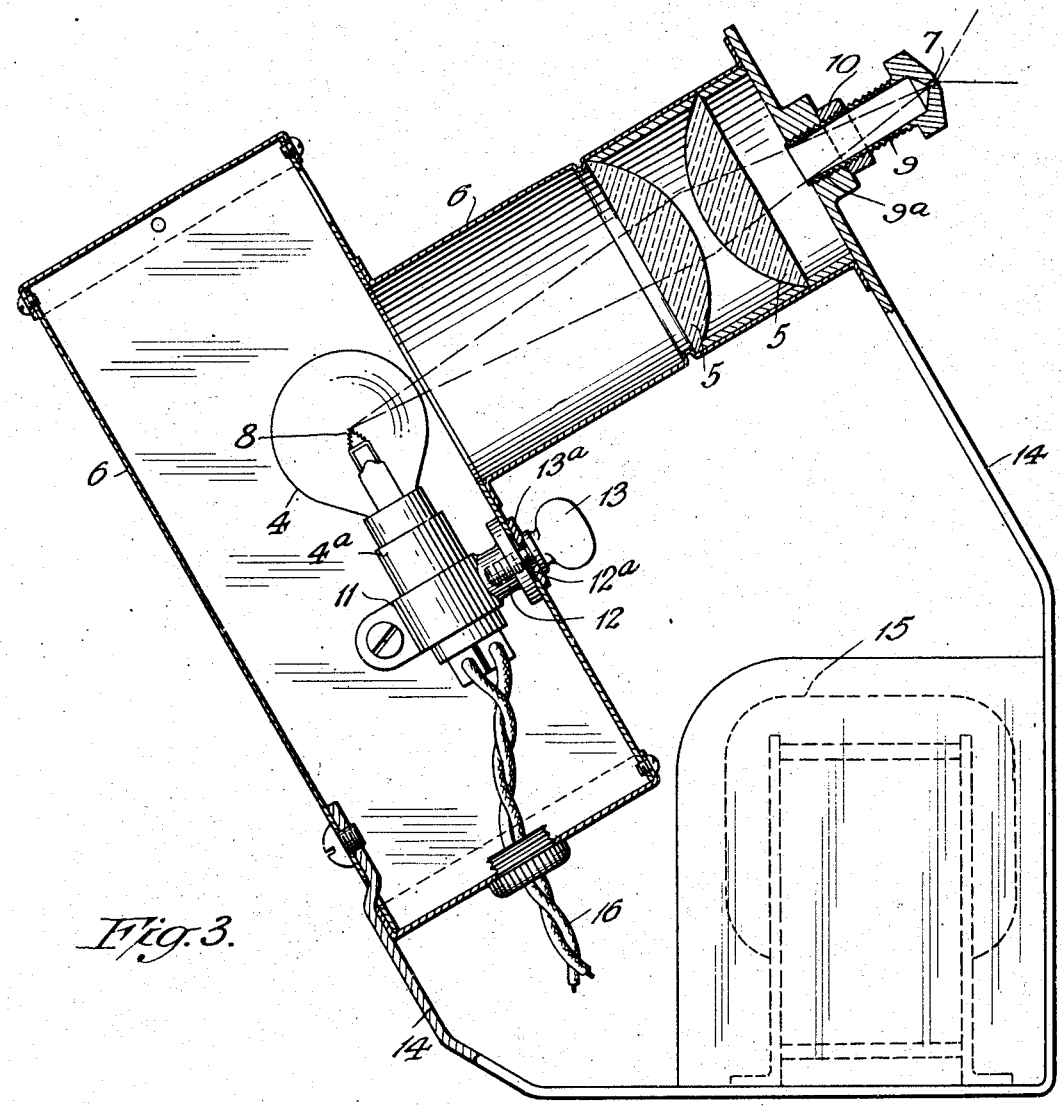
Fig. 3 is a vertical sectional view of the device shown in Fig. 2 taken along the axis of the illuminating system.

A commercial form of device embodying the principles shown in Fig. 1 is illustrated in Figs. 2 and 3 in which embodiment of our invention, we have employed as the light source A, an incandescent lamp 4 of suitably high intensity, and as the optical concentrating system, a pair of plano-convex lenses 5—5 positioned so that the lamp 4 lies on the principal axis somewhat beyond the principal focus of the system to thereby fix the complemental conjugate focus at a finite distance on the other side of the lens system. In order to confine and direct the light rays emanating from the lamp 4 to the desired path through the lenses 5—5, we have provided an enclosing housing 6 which may or may not as desired possess dark interior walls and which also serves to support the lamp 4 and lenses 5—5, the lamp being preferably at one end of the housing and the lenses suitably carried at a distance therefrom, as above described. At the point where the axis of the optical system, extended, intersects the housing 6 on the side of the lenses opposite the lamp 4, there is provided an orifice 7 preferably of small cross-sectional area for the passage of the condensed rays and the length of the housing is preferably made such that this orifice is located substantially at the focus of the condensed rays (the conjugate focus complemental to the lamp 4). In this manner, the positioning of the object to be examined at the best point of concentration and intensity of the light rays is assured by merely bringing the surface of said object adjacent the outer surface of the housing at the orifice 7.

In most cases it will be preferable to have both the orifice 7 and the lamp 4 adjustable relative to the lenses 5—5 so as to insure the adjustment of the device for production of the desired concentrated pencil of rays, this condition being obtained when the orifice and lamp filament 8 are positioned at conjugate foci on the principal axis of the lenses. To this end we have formed the orifice 7 within the closed end of a short tubular member 9 which is threaded at its open end into the housing 6 at 9ª with its axis coinciding with that of the lenses 5—5. Thus, the member 9 with the orifice 7 may be adjusted along the axis of the lenses to position the orifice at the focal point of the condensed rays and then locked in this position as by threading a lock nut 10, carried on the member 9, against the outer surface of the housing 6.

If the orifice is thus made adjustable along the axis of the lenses, it is necessary to make the lamp 4 adjustable only in a vertical plane intersecting the axis of the lenses and not along said axis. This end we obtain by providing a ring-clamp 11 carried by the housing 6 and receiving the base 4ª of the lamp 4 so as to support the latter in a vertical position with the filament 8 lying substantially on the principal axis of the lenses.

A final adjustment of the position of the filament from the outside of the apparatus is preferably provided for so that the clamp 11 may be employed merely for a rough approximation and the finer adjustment made after the device has been set into operation. This may be done in various ways, but we have accomplished it by externally threading the supporting bar 12 of the clamp 11, fixing it to the housing through an enlarged opening 12ª in the latter and locking it in the desired position by means of a suitable thumb screw 13 and washer 13ª, the latter being somewhat larger than the opening in the housing. The clamp supporting bar 12 may thus be adjusted within the enlarged housing opening 12ª until the filament is brought upon the axis of the lenses, as may be easily determined by viewing the lamp 4 through the orifice 7 when the device is in operation, and then locked in this desired position by turning the screw-nut 13 against the wall of the housing.

The housing 6 is preferably supported in such a position upon a suitable framework 14 so that the axis of the optical system makes an angle with the horizontal, preferably one of 30° or greater, as such an arrangement is an extremely convenient one for the examination of objects.

Current for the heating of the filament may be supplied to the apparatus through various sources, such as A. C. and D. C. lighting circuits and storage battery installations, and the particular auxiliary apparatus supplied with our device for connecting it to the source of power will depend upon the particular source on which the power is to be derived. In the embodiment illustrated, we have adapted the device for operation to draw current from an A. C. lighting circuit and since the lamp 4 is preferably a high current-low voltage one, it will be necessary to step-down the voltage from the lighting circuit. This we accomplish by means of a suitable transformer 15, the connections from the transformer to the lamp and A. C. circuit, being made through suitable connecting wire pairs 16 and 17 respectively.

The housing 6 may be provided with a suitable door 18 to give access to the lamp and facilitate the adjustment of the filament on the axis of the lenses.

From the arrangement of parts and process described it will be seen that we have produced a method and apparatus for carrying out the same in which the interior of an object having substantially translucent outer walls may be readily inspected by casting upon the wall of the article a concentrated pencil of light rays of high intensity. In the apparatus described, the accomplishment of this end is assured by positioning the light source and an orifice of small cross-sectional area at conjugate foci of an optical condensing system, the object to be examined being positioned at the outgoing side of the orifice.

In addition to the particular application of the invention herein disclosed, we have also found that it is also adapted for use in the inspection of objects whose interior medium is translucent, such as gems either in the natural and rough or polished state. In this use the device and method aid particularly in the determination of such characteristics as color and flaws. Examples of gems with which the device has been employed with satisfaction are pearls, sapphires, rubies, zircons and topazes.

In the application and use of the device shown and described herein in connection with the inspection of coated or frosted incandescent bulbs, we have discovered that the nature of the light diffusing through one wall when a source of light of high intensity is applied to the exterior side thereof and as viewed through the other wall, changes considerably with the diffusing qualities of the surface and thus can be used as a satisfactory gauge of such diffusing characteristics. When a light source is applied to the surface of a transluscent or semi-translucent medium, such as a frosted or coated incandescent lamp, some of the light will be directly transmitted through the wall and some will be scattered in all directions or diffused, the visibility of the surface or wall being due to this diffused light. The proportion between the amount transmitted and that diffused will depend upon the diffusing quality of the medium and in the present case therefore upon the depth, uniformity and character of the frosting, more light being diffused with thicker and more uniform coatings.

In accordance with another feature of our invention, we have found that the effect obtained by viewing through one wall a light source applied to the opposite side of an opposing wall varies appreciably with the character of the surface or translucency of the medium, and will serve as a gauge of the diffusing quality, or ability, of the wall to which the light is applied. In other words, the amount of light which will be diffused by a given medium when light of a certain intensity falls thereon may be estimated by casting a light source upon the medium, viewing the effect through another translucent medium, placed in the path of the transmitted and diffused light, and comparing such effect with that obtained by subjecting a standard to the same conditions.

When the greater portion of the light applied is diffused by the medium, the result or effect seen when the above method of treatment is employed might be described as an illuminated area of uniform intensity which blends gradually into the surrounding spaces. For example, when the applied light is a concentrated pencil of rays of circular cross-section, the effect is an enlarged circular illuminated area of substantially uniform intensity. As the diffusion power of the medium decreases, this illuminated area of uniform intensity changes and is replaced by a series of illuminated and dark areas or bands, the changes occurring in the central part of the area, leaving an outer area of substantially the same intensity as with almost complete diffusion. The first change which becomes noticeable as the diffusion power of the medium decreases is the occurrence of a dark or shadow area in the center of the image which becomes more intense and more concentrated (that is of smaller area) with the decrease in the amount of light diffused. Simultaneously with the growth and concentration of the dark area, the surrounding illuminated area becomes more concentrated until it becomes substantially a bright, narrow ring of high intensity which tapers off in both directions, toward the central dark spot on one side and the surrounding environment on the other side. The effect which is actually obtained therefore might be described as a central dark area surrounded by a halo of fairly high intensity.

As the diffusion power of the medium is further diminished and the amount of diffused light correspondingly decreased, the distinctness and concentration of both the dark area and the surrounding halo are somewhat reduced and there gradually appears a direct image of the applied pencil of rays at the center of the dark area, this image becoming more sharp with decreased diffusion. At this stage therefore the effect is substantially a small bright spot of high intensity surrounded by a dark area which in turn is enclosed within a second bright or illuminated area or ring of somewhat less intensity, this latter area probably representing the effect of the actually diffused light.

By suitably calibrating a standard and comparing an unknown medium with the results obtained on the standard, the diffusion power of the medium may be conveniently determined. Another method of employing the above described results in measurement or determination of the diffusive character of an unknown medium is to photograph the effects obtained on a number of standards having diffusion powers covering the desired range of diffusive powers and then compare the effects obtained on the unknown with the photographs to determine that standard which the unknown most nearly resembles.

In the manufacture of such devices as frosted incandescent lamps, which must possess a certain diffusive power, the device of our invention has been found particularly satisfactory since it can be employed conveniently to determine the diffusive power of the frosting. In the construction of the device for this use, the intensity of the light source A (lamp 4), cross-sectional area of the orifice 7, and distance of orifice 7 from the source 4 are preferably so chosen that the resulting pencil of rays will be of such intensity and concentration as to produce one of the sharp effects when the wall has the proper diffusive power. In this manner, an actual estimation of the diffusion power is obviated and the process or test made more simple and automatic and therefore more efficient, thereby also adapting it for use by unskilled labor.

What we claim is:—

1. The method of inspecting elements within the interior of hollow articles having a translucent wall provided with a surface of comparatively high translucency which comprises producing upon the translucent surface of the wall, a concentrated secondary light source of minute area and of high intensity.

2. The method of inspecting the filament of an electric light bulb having a translucently coated surface which comprises focusing upon said surface a concentrated secondary light source of minute area and of comparatively high intensity.

3. The method of inspecting the interior of hollow bodies having an outer translucent wall which comprises producing a secondary light source of minute area on a correspondingly minute portion of the surface of the wall to produce a shadow of the elements carried within the body upon the wall opposite that to which the light is applied.

4. The method of inspecting the interior of a hollow article having a substantially transparent interior medium and a relatively translucent outer wall which comprises concentrating a luminous pencil of comparatively high intensity upon a minute portion of the outer surface of the wall to produce an apparent light source of minute area upon said surface.

5. In an apparatus for the inspection of bodies having an outer translucent wall the combination with a source of light and an enclosing housing therefor having a minute aperture for light from the source, of an optical concentrating system interposed between the source and the aperture to focus a concentrated beam of light from the former upon the latter so that a secondary source of illumination of minute area may be produced on the wall of a body tested when the latter is placed adjacent said aperture.

6. In an apparatus of the character described, the combination with a source of light, an optical condensing system, and an enclosing housing therefor confining and directing light rays from the source to a path through the system, of a minute orifice-containing member located in the path of the condensed rays, said member being adjustable along the axis of the condensing system whereby the orifice may be positioned at the focus point of the condensed light rays and whereby a secondary source of illumination of minute area may be produced on the wall of a body tested when the latter is placed adjacent said orifice.

7. The method of inspecting the diffusing quality of the translucent wall of a hollow body which comprises producing a secondary light source of minute area on a correspondingly minute portion of the wall, said light being partly transmitted and partly diffused through said portion into the interior of the hollow body, and viewing the effect thereof on a consequently comparatively large portion of the wall opposite said minute portion.

8. The method of inspecting the interior of a hollow body having a translucent outer wall which comprises concentrating a pencil of light rays of minute cross-sectional area upon the outer surface of the body so as to produce by the dispersion resulting from the penetration of the body an illumination of and shadow formation upon an opposite wall thereof.

Dated April 12, 1927.

PRESTON S. MILLAR.
HAROLD H. MILLAR.